May 16, 1933.  E. L. HOFFMAN  1,909,176
PARACHUTE HARNESS
Filed Oct. 16, 1929   2 Sheets-Sheet 1
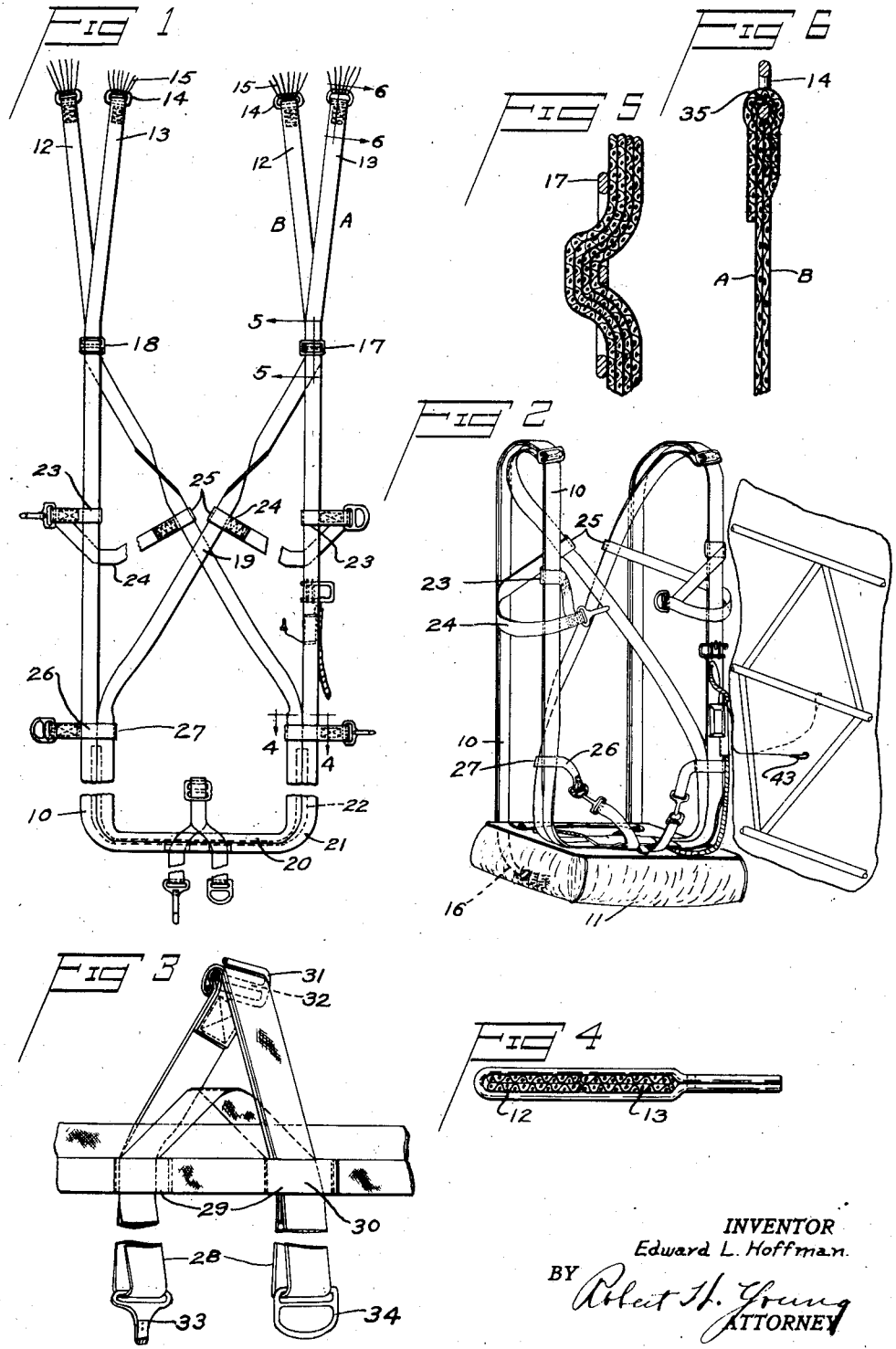
INVENTOR
Edward L. Hoffman.
BY
ATTORNEY May 16, 1933.  E. L. HOFFMAN  1,909,176
PARACHUTE HARNESS
Filed Oct. 16, 1929  2 Sheets-Sheet 2
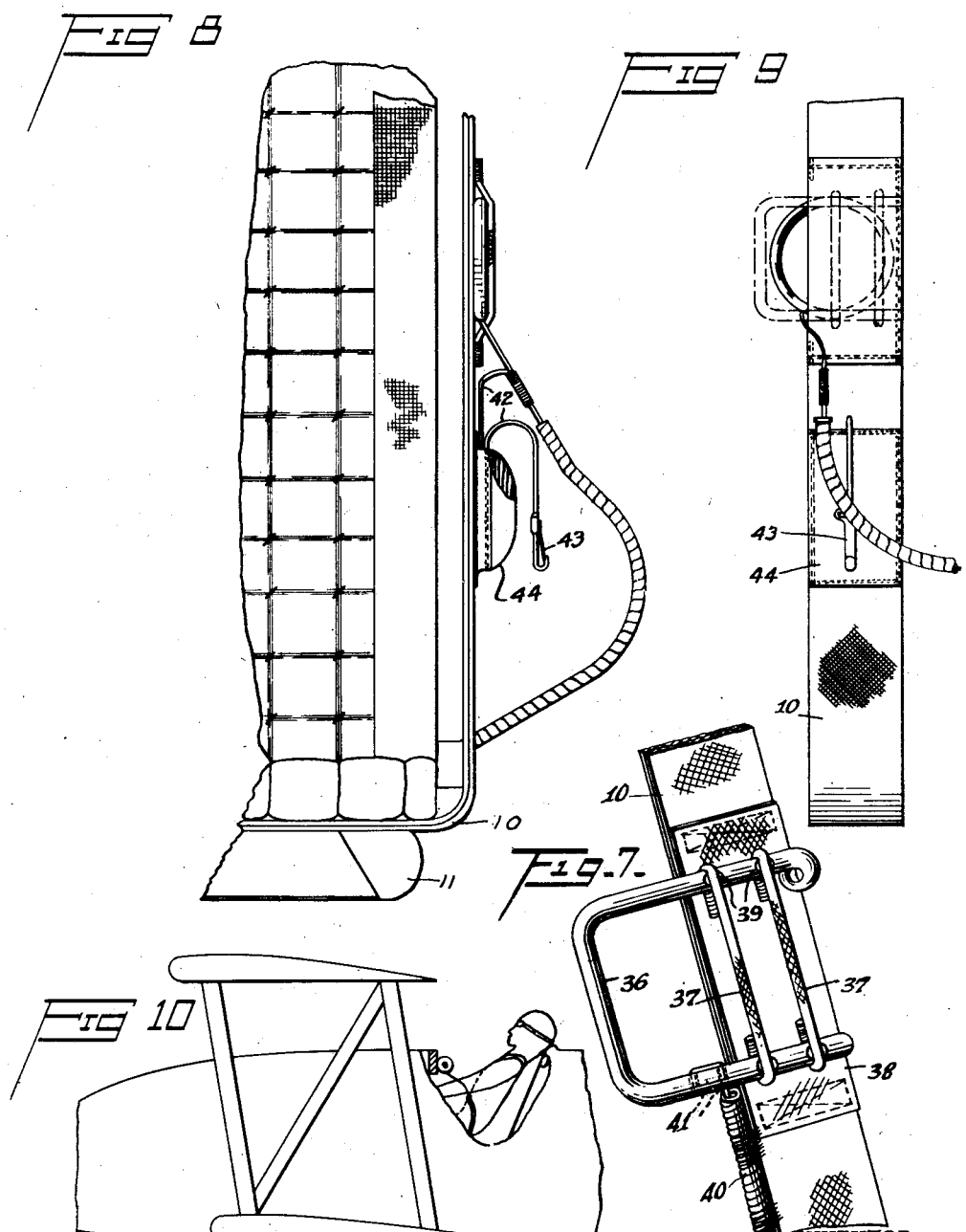

Patented May 16, 1933

1,909,176

UNITED STATES PATENT OFFICE

EDWARD L. HOFFMAN, OF DAYTON, OHIO

PARACHUTE HARNESS

Application filed October 16, 1929. Serial No. 400,045.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

The present invention relates generally to improvements in parachute apparatus and more particularly to a body harness adapted to be connected to a parachute and worn by an aviator.

The main object of the present invention is the provision of a body harness which will be light in weight, flexible in its character, and comfortable to wear, and one which is simple in its construction and yet capable of a wide range of adjustment to adapt the harness to the differences in stature of the different wearers.

Another object of the present invention is the provision of a simple and novel metal connector for attaching the harness to the suspension lines of the parachute and an improved method of fastening the ends of the harness to the said metal connectors whereby to obtain a coupling stronger than has been heretofore possible in ordinary type connector links.

Another object of this invention is the provision of a simple yet novel release handle adapted to be grasped manually whereby to operate the rip cord to release the parachute from its pack, elastic means being provided which holds the release handle securely to the body harness in such a manner as to prohibit the handle from being accidentally disengaged from its holding means.

The invention is further characterized by the provision in a releasing handle as heretofore described of means whereby the joint between the rip cord and handle is of such construction as to permit the rip cord housing end to be fastened closely to the handle without the necessity of a nonflexible joint projecting into the housing as has been necessary in the past.

Another object of the invention is the provision of an automatic releasing device which is connected to the release handle above described and in combining therewith a cable or the like, hereinafter to be referred to as "static lanyard", designed to be firmly secured at its free end to any convenient part of the airplane, the cable being of sufficient length to allow the aviator to fall clear of the aircraft with the parachute before the latter is pulled out of its container. It is intended that the static lanyard shall be stowed loosely in a fabric sack or pouch which is conveniently carried on the harness.

The various features of novelty whereby my invention is characterized will hereinafter be pointed out with particularity in the claims; but for a full understanding of my invention and its objects and advantages, reference may be had to the following detailed description taken in connection with the accompaying drawings wherein Fig. 1 is a lay-out view of a harness detached from its pack with the various parts shown in a manner most clearly to illustrate the method of adjustment of the various parts.

Fig. 2 is a perspective view of the complete harness shown attached to the parachute pack and indicating approximately the position the various parts of the harness assume when worn by the aviator.

Fig. 3 is an enlarged detail view in perspective of the adjustment for the leg straps of the harness.

Fig. 4 is a sectional view taken on line 4—4 of Fig. 1.

Fig. 5 is a sectional view taken on the line 5—5 of Fig. 1 showing the manner of adjusting the riser straps.

Fig. 6 is a sectional view taken on line 6—6 of Fig. 1 which indicates the improved method of attaching the riser straps of the harness to my improved link connector.

Fig. 7 is an enlarged detail view in perspective of the improved release handle in accordance with my invention herein described.

Fig. 8 is an enlarged detail view of the automatic fastening means attached to the parachute harness.

Fig. 9 is a side view of Fig. 8 and

Fig. 10 is a modification of Fig. 8 showing the automatic means mounted onto a part of the airplane fuselage.

Referring more particularly to the drawings wherein like numerals indicate corresponding parts throughout the various figures, the apparatus in the embodiment of the invention herein illustrated comprises a harness generally indicated by numeral 10 shown attached, as will be noted by referring to Fig. 2, to a parachute pack 11 which may be of the lap or seat type, or of the back or chest type. In the present instance and for the purpose of illustrating the harness, it is shown attached to a seat-type pack. The harness comprises essentially a main suspension rigging which consists of main lift webs or risers 12 and 13 which in the open position extend vertically upward and are connected by metallic couplers 14 to the suspension lines 15 of the parachute, as will be noted by referring to Fig. 1, and forming a sling support between the vertically extending lift webs. It will be noted that the suspension lines 15 of the parachute shown in Fig. 1 are arranged in a plurality of groups, there being four shown, the suspension lines of each group having their lower ends fastened to a metal connector in the manner shown. Before the opening of the parachute, the lift webs extend into the pack in which the parachute is folded and packed substantially as shown by numeral 16 in Fig. 2.

Each of the main lift webs respectively are of a continuous strip of fabric or webbing of double thickness, the lift web 12, hereinafter to be referred to as the rear lift web, extending downwardly through the shoulder adapters 17 and 18 respectively, adapted to cross the wearer's back, as shown at 19, a looped portion 20 being thus provided and forming a sling to sustain the weight of the wearer when fastened in the harness. The rear lift web shown in Fig. 1 assumes a half twist due to the manner in which it is exposed on the figure. In a like manner the lift web 13, hereinafter to be referred to as the front lift web, extends downwardly and through the shoulder adapters 17 and 18 and continuing on in front of the wearer's body to form a looped portion 21 in the same manner as above described. Both of the aforesaid lift webs are then carried under the wearer's body and are sewed together by a tape or any other suitable means 22 forming a main lift portion extending approximately from one thigh to the other, the width of the said portion being the combined width of both webs, as will be noted by referring to Fig. 4.

Threaded to the main rigging by means of loops 23 sewed at at their ends are the breast straps 24 so arranged that the looped portions referred to can be slid up or down on the front lift web and also the rear lift web to adjust for the difference in height and girth of the wearer, for the reason that since the rear lift webs cross the back of the wearer diagonally sliding the looped end 25 of the breast strap up or down increases or decreases the girth. The method of attachment of the breast straps to the diagonally extending portions of the rear lift web 12 may be reversed and in so doing the adjustment would be in a reverse order.

The thigh straps 26 are composed of strips of webbing, the ends of which are provided with looped portions 27 which encompass both the front and rear lift web and thus can be moved up or down for adjustment.

The leg straps 28 are constructed of a single length of webbing threaded through spaced looped portions 29 formed in a guide strip 30 attached to the front lift web. The straps are adjustable through the use of a buckle 31, one end of the strap 28 being fastened to a central bar 32 of the buckle by looping the end of the strap and sewing as shown. The strap 28 is then passed through one of the aforementioned loops formed in the guide strip 30, threaded onto a snap fastener 33 and looped back through guide strap 28 thereby forming one leg strap generally; in a like manner the strap continues on, passing underneath the front lift web and through the second loop formed in the guide strip 30 threaded through a metal link 34 looped back and through the guide strap 28 and lastly looped through the buckle 31. In this manner the loose end of the strap can be adjusted on the buckle to vary the adjustment of both leg straps at the same time.

The breast straps and thigh straps each carry snap fasteners and link connectors similarly to the type shown on the leg straps and are of conventional design and require no further description.

The adjustment of the harness for persons of different sizes and stature is made by first suitably moving the shoulder adapters 17 up or down, followed in order by adjusting the length of the leg straps by means of the buckle 31 and raising or lowering the two ends respectively or separately of the breast straps by sliding either one of the ends of said straps up or down. When the proper fit has been made, the slidable loops on the straps may, if desired, be sewed in place. The harness, of course, is fastened at the bottom to the parachute pack 11.

Fig. 6 shows in detail the manner in which the two fabric straps forming the main lift webs are fastened to the connector link. It will be seen that the inner strap designated by letter A is first threaded through the connector link 14 and then sewed, forming a looped end 35, after which the outer strap, designated by letter B is threaded through the connector link and sewed to the inner strap and to itself respectively which is effective in producing a much stronger and more dependable connection than has been heretofore obtained.

The parachute pack may be released in any suitable manner; but I prefer to use the construction shown in detail in Fig. 7 embodying a rip cord handle which consists of a U-shaped piece 36, preferably of metal tubing. The handle 36 is retained on the harness by means of elastics 37 sewed to an auxiliary tape 38 which in turn is sewed to the parachute harness. The elastics are adapted to register under tension in indentations or grooves 39 provided at spaced intervals on the handle. The housing 40 for the rip cord is positioned close to the handle as shown, suitable openings 41 being provided on the one side of the handle to receive the rip cord threaded through the end and soldered or otherwise secured in place. This arrangement permits of the rip cord handle being held close to the wearer and to the harness and under tension in its container in such a manner that the handle cannot be accidentally disengaged from its container and yet which permits of its being easily and willfully withdrawn.

If desired the rip cord may be so arranged as to be operated either manually or automatically. In the modified form of the invention shown in Figs. 8 and 9, the rip cord is shown as being joined to a flexible cable or rope 42 herein referred to as static lanyard, the free end of which is provided with suitable means, such as a snap fastener 43, which may be attached to any convenient part of the aircraft. It is intended that the cable 42 shall be of such length as to permit the aviator to jump free of the airplane before the parachute shall be released. A pouch 44 is provided which is secured to the harness and conveniently located with respect to the rip cord which shall contain the looped ends of the cable therein until needed. It will be noted that the static lanyard is joined to the rip cord adjacent the rip cord handle. From the foregoing, it will be evident that the aviator can either use the rip cord handle to manually release the parachute from its pack or, if he desires, he may hook the snap fastener attached to the end of the static lanyard to any convenient part of the airplane so that the parachue can be automatically released after he has fallen clear of the airplane.

Fig. 10 indicates a still further modified form of the automatic releasing means, in this case, the pouch for carrying the static lanyard being shown as fastened to the airplane instead of to the harness.

While I have illustrated and described the preferred form of construction for carrying my invention into effect, it is to be understood that variations and modifications may be made without departing from the spirit of the invention. I, therefore, do not wish to be limited to the precise details of construction set forth but desire to avail myself of variations and modifications as may come within the scope of the appended claims.

Having thus described my invention, what I claim as new and desire to secure by Letters Patent is:—

1. A parachute harness comprising a pair of looped members joined at their ends to form a suspension rigging adapted for attachment to a parachute and connected substantially at the apex of their loops to form a seat support, one of said members having its end portions crossed to provide a back support for the wearer.

2. A parachute harness comprising a pair of looped suspension members depending in the form of a sling from a parachute, one of said suspension members adapted to extend in the front of the chest of the aviator, the other member being adapted to extend along the back of the aviator, both of said members being connected together substantially at the apex of their looped portions to form a seat support for said aviator.

3. A parachute harness comprising a pair of looped members joined at their ends to form a suspension rigging adapted for attachment to a parachute, the looped portions of said members being connected together to provide a seat support in which the wearer is adapted to be seated, one of said looped portions extending in front of the wearer's body, the other member having its ends crossed and extending diagonally across the back of the wearer's body whereby to provide a support therefor.

4. A parachute harness comprising a pair of straps depending in the form of a sling from a parachute to provide means for supporting an aviator therein, one of said straps passing vertically downward along both sides of the chest and under the seat of the aviator, the other member having its ends crossed to pass diagonally along the aviator's back and under the seat whereby to form a support therefor, and an upper body harness comprising a pair of chest straps connected to said supporting means having fastening means thereon to permit of said straps being joined across the aviator's chest to secure him within said harness.

5. A parachute harness comprising a pair of looped members joined at their ends to form a suspension rigging adapted for attachment to a parachute and connected substantially at the apex of their loops to form a seat support, one of said members having its end portions crossed to provide a back support for the wearer, and body supporting means comprising a strap adjustably secured to one of said crossed portions.

6. A parachute harness comprising a pair of straps depending in the form of a sling from a parachute to provide means for supporting an aviator therein, one of said straps passing vertically downward at the sides of the chest and under the seat of the aviator, the other strap having its ends crossed to pass diagonally along the aviator's back and crossing under the seat whereby to form a seat support together with said first mentioned strap and upper body harness comprising a pair of chest straps adjustably connected to said supporting means and a single quick releasable fastening means to join said chest straps across the chest of the aviator whereby to secure him within said harness.

7. A parachute harness comprising a pair of suspension members depending in the form of a sling from a parachute to provide means for supporting an aviator therein, one of said straps extending vertically downward at the sides of the chest and crossing under the seat of the aviator, the other strap having its ends crossed to pass diagonally along the aviator's back and crossing under the seat to form a seat support together with said first mentioned strap, an upper body harness for said supporting means comprising a pair of chest straps each being adjustably connected to a vertical portion and a diagonally extending portion of said suspension members whereby to adjust for height and girth of the aviator and means to connect said chest straps across the aviator's chest to secure him within said harness.

8. A parachute harness comprising a pair of looped members joined at their ends to form a suspension rigging adapted for attachment to a parachute, the looped portions of said members being connected together to provide a seat support in which the wearer is adapted to be seated, one of said looped members extending in front of the wearer's body, the other member having its end portions extending diagonally across the back of the wearer's body whereby to provide a support therefor.

9. A parachute harness comprising a pair of looped members joined at their ends to form a suspension rigging adapted for attachment to a parachute, one of said looped members extending in front of the wearer's body, the other member extending in back of the wearer's body, the looped portions of said rigging being connected together to provide a seat support in which the wearer is adapted to be seated.

10. A parachute harness comprising a pair of looped suspension members joined at their ends and depending in the form of a sling from a parachute to provide means for supporting an aviator therein, one of said members having its ends crossed to provide a back support for the aviator, a pair of chest straps adjustably connected to each of said suspension members, the positioning of said chest straps up or down on the crossed portions of the one member serving to increase or decrease the overall effective length of said chest strap whereby to adjust for the girth of the aviator and a quick releasable fastening means to join said straps across the chest of the aviator to secure him within said harness.

11. A parachute harness comprising a pair of looped suspension members joined at their ends and depending in the form of a sling from a parachute and connected together substantially along their looped ends to form a seat support, an upper body harness comprising a pair of chest straps fastened to said suspension members and adapted to be detachably joined across the chest of an aviator, a lower body harness comprising a pair of thigh straps attached to said suspension members and a single continuous strap having looped ends forming leg straps slidably connected to said sling and adapted to be detachably secured to said thigh straps whereby to encircle the aviator's thighs.

12. A parachute harness comprising a pair of looped suspension members joined at their ends and depending in the form of a sling from a parachute and connected together substantially along their looped ends to form a seat support, an upper body harness comprising a pair of chest straps fastened to said suspension members adapted to be detachably joined across the chest of an aviator, a lower body harness comprising a pair of thigh straps slidably adjustably connected to said suspension members and a single continuous strap having looped ends forming leg straps adjustably connected to said sling substantially midway of the looped portions thereof adapted to be passed about the aviator's thighs and detachably secured to said thigh straps.

13. A parachute harness as set forth in claim 11 together with a single means for varying the overall length of said continuous strap whereby to simultaneously adjust the effective length of said leg straps.

14. A universally adjustable parachute harness comprising a pair of looped suspension members having means thereon for adjustably securing their end portions together to form a suspension rigging adapted for attachment to a parachute and connected together substantially at the apex of their loops to form a seat support in which an aviator is adapted to be seated, one of said straps extending vertically downward at the sides of the chest and crossing under the seat of the aviator, the other strap having its ends crossed to pass diagonally along the aviator's back and crossing under the seat to form a seat support together with said first mentioned strap, an upper body harness for said supporting means comprising a pair of chest straps each strap being adjustably connected to a vertical extending portion and a diagonally extending portion of said suspension members whereby to adjust for height and girth of the aviator, and a lower body harness comprising a pair of thigh straps slidably adjustably connected to said suspension members and a single continuous strap having looped ends forming leg straps adjustably connected to said sling substantially midway of the looped ends thereof, adapted to be passed about the aviator's thighs and detachably secured to said thigh straps, said upper and lower body harness and said adjustable means on the end portions of said suspension rigging being adjustable to conform to the stature of the aviator.

15. The combination with a parachute harness and a pack therefor, of a release cord extending from said pack, of a U-shaped member on the free end of said release cord and means for releasably holding said member on said harness.

16. The combination with a parachute harness and a pack therefor, of a release cord extending from said pack, a U-shaped handle on the free end of said release cord and elastic means mounted on said harness for yieldably holding said handle thereon.

17. The combination with a parachute harness and a pack therefor, of a release cord extending from said pack, a U-shaped handle on the free end of said release cord, a plurality of grooves provided in the sides of said U-shaped member and elastic means mounted on said harness, adapted to rest in said grooves under tension whereby to yieldingly hold said handle thereon.

18. In combination with a release cord handle attachment having a resilient cord forming a pocket, of a handle disposed within said pocket and having a groove for receiving said resilient cord.

19. A parachute harness including a main lift web, the end of which is adapted to be connected to suspension lines of a parachute, said web comprising a connector link for said suspension lines and two strips of fabric, each strip having its end looped in opposite directions through said connector link and extending rearward in overlapped relation the body portion of the other, and two sets of fastening means independent of one another for securing said ends to their respective body portions, one of said means securing solely one end to its respective body portion and the other means securing the other end to both body portions.

20. A parachute harness including a main lift web, the end of which is adapted to be connected to suspension lines of a parachute, said web comprising a connector link for said suspension lines and two strips of fabric, each strip having its end looped in opposite directions through said connector link and extending rearward in overlapped relation to the body portion of the other, and two sets of rows of stitching independent of one another for securing said ends to their respective body portions, one of said rows securing solely one end to its respective body portion and the other of said rows securing the other end to both body portions and to the former end.

21. The combination with a parachute harness and a pack therefor, of a release cord extending from said pack, of a handle, with a hand grasping portion and free sides extending from said hand grasping portion, the free end of said release cord connected to one of said sides, and elastic means mounted on said harness for yieldably holding said free sides thereon.

In testimony whereof I affix my signature.
EDWARD L. HOFFMAN.